US009743246B2

(12) United States Patent
Su et al.

(10) Patent No.: US 9,743,246 B2
(45) Date of Patent: Aug. 22, 2017

(54) PORTABLE RESOURCE MANAGEMENT SYSTEMS AND METHODS

(71) Applicant: Intertrust Technologies Corporation, Sunnyvale, CA (US)

(72) Inventors: Dennis Su, Sunnyvale, CA (US); Yiming Ma, Fremont, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 121 days.

(21) Appl. No.: 13/943,711

(22) Filed: Jul. 16, 2013

(65) Prior Publication Data

US 2014/0024392 A1 Jan. 23, 2014

Related U.S. Application Data

(60) Provisional application No. 61/672,563, filed on Jul. 17, 2012.

(51) Int. Cl.
*H04W 4/02* (2009.01)
*H04W 4/00* (2009.01)

(52) U.S. Cl.
CPC .......... *H04W 4/025* (2013.01); *H04W 4/001* (2013.01)

(58) Field of Classification Search
CPC ... H04W 64/00; H04W 64/003; H04W 36/32; H04W 84/005; H04W 4/02; H04W 4/008; H04W 4/021
USPC ...................................................... 455/456.2
See application file for complete search history.

(56) References Cited

U.S. PATENT DOCUMENTS

| | | | |
|---|---|---|---|
| 8,180,371 B1 | 5/2012 | Izdepski et al. | |
| 8,180,583 B1 | 5/2012 | Gossweiler et al. | |
| 2005/0043037 A1* | 2/2005 | Ioppe | H04W 4/02 455/456.1 |
| 2009/0098880 A1 | 4/2009 | Lindquist | |
| 2009/0298480 A1 | 12/2009 | Khambete et al. | |
| 2010/0279706 A1* | 11/2010 | Dicke | H04M 1/72572 455/456.1 |
| 2010/0293049 A1 | 11/2010 | Maher et al. | |

(Continued)

FOREIGN PATENT DOCUMENTS

| | | | | |
|---|---|---|---|---|
| CA | WO 2012106798 A1 * | 8/2012 | ........... | G01S 5/0063 |
| CN | WO 2012000186 A1 * | 1/2012 | ........ | H04M 1/72569 |
| WO | WO 2012/000186 A1 | 1/2012 | | |

OTHER PUBLICATIONS

Extended European Search Report dated Dec. 1, 2015; EP Application No. 13819607.6; 7 pages.

(Continued)

*Primary Examiner* — George Eng
*Assistant Examiner* — Jing Gao
(74) *Attorney, Agent, or Firm* — Finnegan, Henderson, Farabow, Garrett & Dunner, LLP

(57) ABSTRACT

This disclosure relates to systems and methods for managing resources of a mobile device based on a state of the device. In certain embodiments, systems and methods disclosed herein may adjust utilization of one more device systems and/or sensors based on a state of a device to better utilize device power or other resources. In further embodiments, systems and methods disclosed herein may utilize one or more power-efficient systems to determine when a device is in a transitory state and to schedule precise location determination events at times when the device is more likely to be located at a point of interest.

8 Claims, 8 Drawing Sheets

(56) References Cited

U.S. PATENT DOCUMENTS

| | | |
|---|---|---|
| 2010/0293050 A1 | 11/2010 | Maher et al. |
| 2010/0293058 A1 | 11/2010 | Maher et al. |
| 2010/0299522 A1 | 11/2010 | Khambete |
| 2011/0279323 A1* | 11/2011 | Hung ............... G01S 19/14 342/451 |
| 2012/0064917 A1 | 3/2012 | Jenkins et al. |
| 2012/0100866 A1* | 4/2012 | Grossman et al. ........ 455/456.1 |
| 2012/0164969 A1* | 6/2012 | Bhatia et al. ............. 455/404.2 |
| 2013/0332987 A1 | 12/2013 | Tenneti et al. |
| 2014/0025660 A1 | 1/2014 | Mohammed et al. |
| 2014/0128105 A1 | 5/2014 | Su et al. |

OTHER PUBLICATIONS

International Search Report and International Written Opinion mailed Aug. 23, 2013 for application No. PCT/2013/050760.

* cited by examiner

| Time - 302 | Set of Parameters - 304 | Device State - 306 | Sensor - 308 | Polling Rate (Polling Events/Sec) - 310 |
|---|---|---|---|---|
| 12:00 AM – 7:00 AM - 312 | Parameter 1 - 314 | Sleep State - 320 | Sensor 1 - 322 | t1 - 324 |
| | Parameter 2 - 316 | | Sensor 2 | t2 |
| | Parameter 3 - 318 | | Sensor 3 | t3 |
| 8:00 AM – 6:00 PM | Parameter 3 | Office State | Sensor 1 | t1 |
| | Parameter 2 | | Sensor 2 | t1 |
| | Parameter 4 | | Sensor 3 | t1 |
| 6:00 PM – 7:00 PM | Parameter 5 | Navigation State | Sensor 1 | t1 |
| | Parameter 4 | | Sensor 2 | t2 |
| | Parameter 3 | | Sensor 3 | t2 |
| 7:00 PM – 10:00 PM | Parameter 2 | Home State | Sensor 1 | t3 |
| | Parameter 5 | | Sensor 2 | t2 |
| | Parameter 6 | | Sensor 3 | t3 |

Figure 3

PORTABLE RESOURCE MANAGEMENT SYSTEMS AND METHODS

RELATED APPLICATIONS

This application claims the benefit of priority under 35 U.S.C. §119(e) to U.S. Provisional Patent Application No. 61/672,563, filed Jul. 17, 2012, and entitled "PORTABLE RESOURCE MANAGEMENT SYSTEMS AND METHODS", which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

Advancements in wireless communication technology have greatly enhanced the versatility of mobile and/or portable electronic devices. These advancements have enabled devices to provide a wide variety of functionalities including, without limitation, multimedia recording and playback, event scheduling, work processing, e-commerce, and/or the like.

A typical mobile device may include a variety of applications, such as navigation aids, business directories, news and weather services, targeted advertisement services (e.g., targeted coupons and/or deal services), and/or the like. In certain circumstances, these applications may utilize one or more sensors associated with a mobile device to perform one or more operations including, for example, location identification operations, navigation operations, and communication operations (e.g., via the Internet, WiFi, the cellular network, etc.). Such sensors may utilize power provided by one or more resources of a mobile device (e.g., a battery system). Mobile device resources, including resources configured to provide power to mobile device sensors, may be limited for a variety of reasons.

Systems and methods disclosed herein may facilitate efficient management of resources of a mobile device. In certain embodiments, systems and methods disclosed herein may manage resources of a mobile device by varying utilization of a system of a mobile device based, at least in part, on one or more states of the mobile device. For example, consistent with embodiments disclosed herein, a polling rate associated with one or more sensors of the mobile device may be varied based, at least in part, on one or more states of the mobile device, thereby efficiently managing battery resources of the device.

In some embodiments, a method for operating a mobile device is provided. The method may include determining one or more states associated with the mobile device (e.g., a moving state, a stationary state, a location-specific state, etc.) based, at least in part, on a data set (e.g., data measured by one or more sensors, statistical data, and/or any other suitable data). The method may further include varying a polling rate of one or more sensors associated with the mobile device based, at least in part, on the one or more determined states. In some embodiments, sensor data included in the data set may comprise some or all of coordinates of a location of the mobile device, an orientation of the mobile device, metadata associated with background sound proximate to the mobile device, battery level information for the mobile device, mobile device signal strength, signal-to-noise ratios of the mobile device, and/or the like.

In further embodiments, a mobile device is disclosed. The mobile device may include one or more sensors configured to measure a set of parameters indicative of one or more states of the mobile device. The mobile device may further include a processor configured to determine one or more states of the mobile device based, at least in part, on the measured set of parameters. The processor may further be configured to vary a polling rate of one or more sensors associated with the mobile device based, at least in part, on the one or more determined states.

In still further embodiments, a computing device comprising a processor and a memory (e.g., a non-transitory computer-readable storage medium) is disclosed. The memory may store a set of instructions that, when executed by the processor, cause the computing device to measure a set of parameters indicative of one or more states of the device using one or more sensors associated with the device. The instructions may further cause the processor to vary a polling rate of one or more sensors associated with the mobile device based, at least in part, on the one or more determined states, the set of parameters, and/or any other suitable statistical data. In some embodiments, the statistical data may comprise one or more prior states, time spent in one or more prior states, polling rates associated with at least some of the one or more sensors for the one or more prior states, user activity data, and/or the like. In one embodiment, the statistical data can be updated based on sensor data.

BRIEF DESCRIPTION OF THE DRAWINGS

The inventive body of work will be readily understood by referring to the following detailed description in conjunction with the accompanying drawings, in which:

FIG. 3 illustrates an exemplary data structure for maintaining statistical data consistent with embodiments of the present disclosure.

DETAILED DESCRIPTION

Figure 1:
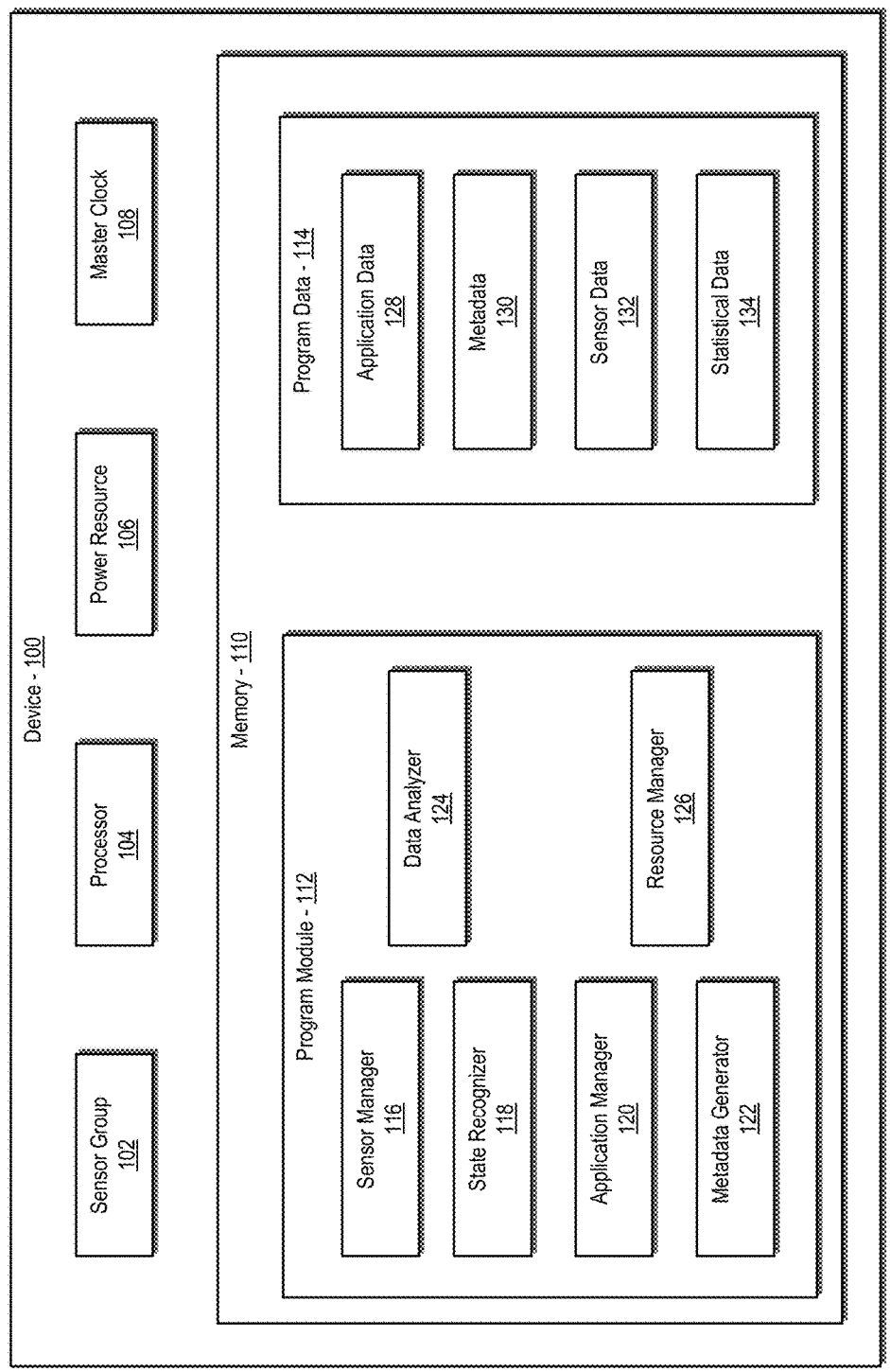
FIG. 1 illustrates a block diagram of a mobile device consistent with embodiments of the present disclosure.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Mobile devices (e.g., smartphones, tablets, other portable devices, etc.) often include a panoply of features and sensor systems. For example, many mobile devices may include accelerometers, Global Positioning System ("GPS") sensors, gyroscopes, proximity sensors, magnetometers, cameras, wireless communication systems (e.g., Bluetooth®, WiFi, cellular radios, etc.), and/or the like. During operation, such systems and/or sensors may utilize one or more resources of a mobile device. For example, mobile device systems and/or sensors may be powered by a power resource of a mobile device (e.g., a battery system), may utilize processing power of a processing resource of a mobile device, and/or may utilize other available resources of a mobile device.

Systems and methods disclosed herein may facilitate efficient management of resources of a mobile device. In certain embodiments, systems and methods disclosed herein may manage resources of a mobile device by varying a polling rate or other activity associated with one or more systems and/or sensors of the mobile device based, at least in part, on one or more determined states of the mobile device. For example, a mobile device may be determined to be associated with a stationary state based on data measured by one or more device sensors. Using this state information, the mobile device may reduce a polling rate of a GPS sensor associated with the device, as less frequent usage of the GPS sensor may not significantly impact location-based services if the mobile device is substantially stationary.

The polling rate of a device sensor may be related to power consumed by the sensor from a battery power resource. For example, a GPS sensor may utilize more power when operating at a polling rate of one poll per 10 μs than when operating at a polling rate of one poll per 10 ms. Accordingly, varying polling rates based on a state of a mobile device consistent with the systems and methods disclosed herein may help to optimize utilization of available battery resources, thereby increasing battery life of the mobile device.

A state of a device may be determined in a variety of ways. For example, in some embodiments, a state of a device may be determined based, at least in part, on parameters measured by one or more sensors associated with the device. For example, a state of the device may be location dependent and, using one or more location-based sensors, a location of the device may be identified and an associated state for the device may be determined. In certain embodiments, a state of a device may be determined based on other information measured by sensors. For example, a light sensor and/or an orientation sensor on a device may be used to determine the state of a device (e.g., in a user's pocket or the like). As yet another example, the time/date indicated by the device could be used at least in part to determine the state of the device.

In further embodiments, a state of a device may be determined based on a user's interactions with and/or activities using the device. For example, a user may indicate via an application of the device (e.g., a social networking application) an indication of their location and/or an activity being performed using the device (e.g., "at the office", "going to the movie", "playing a game", etc.), and a state of the device may be determined based on such an indication. Similarly, information may be gathered by monitoring a user's activity using the device (e.g., monitoring activity of one or more device applications) and such information may be utilized to determine a state of the device. In yet further embodiments, a device state may be determined based on input provided by a user, personal information gathered and/or maintained by a personal agent associated with the device and/or user, one or more predictive methods utilizing prior device and/or user behavior, and/or the like. Information utilized to determine a state of a device may be referred to herein as state information. It will be appreciated that there are a variety of techniques for determining a state of a device, and that for purposes of practicing the systems and methods disclosed herein, any suitable technique may be used.

In certain embodiments, the systems and methods described herein can, for example, be used in connection with information (e.g., advertisement) matching and/or targeting technologies such as those described in commonly assigned co-pending U.S. patent application Ser. No. 12/785,406, "Content Delivery Systems and Methods," filed May 21, 2010, and published as U.S. Pub. No. 2010/0293049 A1 ("the '406 application"), and/or U.S. patent application Ser. No. 13/914,538, "Data Collection and Analysis Systems and Methods," file Jun. 10, 2013 ("the '538 application"), each of which is hereby incorporated herein by reference in its entirety. In such embodiments, information inferred or gathered from a device's sensors may be used by the information targeting technology to more effectively target information to a user. For example, data collected by polling a device's GPS sensors may be used to present the user with an advertisement, coupon, offer, etc. associated with a business, product or service in the user's immediate vicinity or in the vicinity of the user's inferred destination. The collection of such sensor data, however, typically consumes power, and thus may accelerate the drain of the device's battery. Thus, in some embodiments, systems and methods such as those described herein can be used to determine the state of the device, and use this information to intelligently determine an optimal frequency at which to poll device sensors (e.g., to provide a desired balance between preserving battery life and presenting the user with timely and useful targeted information).

FIG. 1 illustrates a block diagram of a mobile device 100 consistent with embodiments of the present disclosure. Device 100 may comprise a variety of computing devices and systems, including any mobile system and/or device suitable to implement the systems and methods disclosed herein. For example, device 100 may comprise a laptop computer system, a wireless communication device (e.g., a smartphone or other cellular telephone), a tablet computer, a wireless control device (e.g., a remote control device), a gaming or other entertainment device, and/or the like.

The device 100 may include, without limitation, one or more communicatively coupled sensors 102 (e.g., a sensor group), processors 104, power resources 106 (e.g., a battery system, a solar power system, an AC and/or DC power supply system, and/or the like), a clock 108, and/or a memory 110. The one or more sensors 102 may include, without limitation, one or more accelerometers, GPS sensors (e.g., assisted GPS ("A-GPS") sensors), acoustic sensors, infra-red sensors, imaging sensors, gyroscopes, proximity sensors, light sensors, magnetometers, cameras, clocks, thermometers, pressure gauges, wireless communication systems, and/or any other suitable system (e.g., a network interface) and/or sensor for detecting and/or measuring data associated with the device 100 and/or its surroundings. Sensors 102 may be implemented using any suitable technology or technologies including, without limitation, VLSI video, optical gyros, Micro-Electro Mechanical Systems ("MEMS"), and/or the like. The one or more sensors 102 may be configured to measure one or more parameters associated with the device 100. It will be appreciated that there are a variety of devices, systems, and/or sensors that may be utilized to implement embodiments of the systems and methods disclosed herein, and that any suitable devices, systems, and/or sensors may be used in connection with the disclosed embodiments.

Parameters measured by sensors 102 may be indicative of one or more states associated with the mobile device 100. Exemplary parameters measured by sensors 102 may include, without limitation, parameters relating to a location of the mobile device 100, an orientation of the mobile device 100, data associated with sounds proximate to the mobile device 100, battery levels of the mobile device 100, device signal strength, signal-to-noise ratio of a signal received by the mobile device 100, and/or any other parameter relating to the mobile device 100 that may be indicative of a state of the mobile device 100.

In certain embodiments, the one or more states may comprise one or more device location and/or orientation-based states. For example, the one or more states may include without limitation, a moving state, a stationary state, a device orientation state, a location-specific state, and/or any other location and/or orientation-based state. In further embodiments, the one or more states may comprise one or more device activity-based states. For example, the one or more states may include, without limitation, a sleep state, an active state, an application-specific active state, and/or any other state relating to activities being performed by a user on mobile device 100.

As discussed above, a device state may be determined by device 100 in a variety of ways. For example, a device state may be determined based on, at least in part, on a variety of types of state information including, without limitation, parameters measured by one or more sensors 102 associated with the device 100 (e.g., location-based measured parameters, orientation-based measurement parameters, etc.), information based on a user's interactions with and/or activities using the device 100, input provided by a user, personal information gathered and/or maintained by a personal agent associated with the device 100 and/or a user, one or more predictive methods utilizing prior device 100 and/or user behavior, and/or the like. In certain embodiments, one or more constituent components of device 100 may determine a state of the device 100 based on available state information. In further embodiments, one or more separate systems associated with device 100 may determine a state of the device 100 based on available state information.

A processor 104 may be communicatively coupled to the sensors 102, power resource 106, clock 108, and/or memory 110. The processor 104 may comprise, for example, a microprocessor, a microcontroller, logic circuitry, an applications processor, a baseband processor, an x86 processor, a RISC processor, an ASIC processor, a CSIC processor, an ARM processor, and/or any other suitable type of processor utilizing any suitable processor architecture or technology. The processor 104 may be configured to execute instructions stored by memory 110 to perform certain methods disclosed herein. In some embodiments, device 100 may alternatively, or in addition, comprise a secure processing unit ("SPU") (not shown) configured to perform sensitive operations such as trusted credential and/or key management, secure policy management, and/or other secure processes and/or methods. The device 100 may further comprise software and/or hardware configured to enable electronic communication of information to/from the device 100 via a network using any suitable communication technology and/or standard.

The power resource 106 may be configured to supply electrical power to various components of the mobile device 100 (e.g., the sensor group 102, processor 104, clock 108, memory 110, etc.). In some embodiments, the power resource 106 may comprise a battery. In further embodiments, the power resource 106 may be configured to receive power from an external power resource. For example, the power resource 106 may comprise an AC/DC power supply and/or transformer system. The power resource 106 may include a variety of components including, for example, rectifiers, voltage and/or current regulators for supplying regulated power to various components of the device 100, transformers, and/or any other suitable component.

The clock 108 may generate one or more clock signals utilized by various systems of the mobile device 100. For example, the clock 108 may generate a first clock signal that is utilized by the processor 104 to execute a set of instructions stored by the memory 110. In some embodiments, clock 108 may comprise a master clock. For example, the clock 108 may be configured to generate a second clock signal utilized by one or more sensors in the sensor group 102 to measure a set of parameters. In certain embodiments, the frequency of the second clock signal may be associated with a "polling rate" associated with some or all of the sensors in the sensor group 102. As used herein, a polling rate may be a frequency at which data is acquired from, and/or other actions are taken by, one or more sensors in a device. The clock 108 may utilize any suitable technology or technologies including, without limitation, quartz crystal oscillators, Phase-locked Loop ("PLL") clocks, and/or the like.

Memory 110 may be configured to store data, instructions and/or modules for use and/or execution by processor 104. In certain embodiments, memory 110 may comprise a non-transitory computer-readable storage medium. Memory 110 may be implemented using any suitable memory technology or technologies including, without limitation, random access memory ("RAM"), read only memory ("ROM"), hard disk drives ("HDD"), secure digital ("SD") card, flash memory, and/or the like. In some embodiments, the memory 110 may include a program module partition 112 and a program data partition 114.

The program module partition 112 may include a set of instructions that can be executed by the processor 104 to perform specific actions on the device 100. As described in more detail below, the program module partition 112 may include, among other things, a sensor manager 116, a state recognizer 118, an application manager 120, a metadata generator 122, a data analyzer 124, and a resource manager 126. The program data partition 114 may include, without limitation, application data 128, metadata 130, sensor data 132, and/or statistical data 134 (e.g., statistical data regarding historical patterns of a set of parameters, sensor data, usage patterns, and/or any other data).

The sensor manager 116 may be configured to manage the operation of one or more sensors in the sensor group 102. In some embodiments, the sensor manager 116 may manage a polling rate associated with one or more sensors in the sensor group 102 by varying the frequency of a clock signal provided by clock 108. The sensor manager 116 may further store one or more parameters (e.g., a set of parameters) measured by the sensor group 102 as sensor data 132 in the program data partition 114 of memory 110. In certain embodiments, the sensor manager 116 may include drivers for one or more sensors in the sensor group 102.

The state recognizer 118 may be configured to determine a state of the device 100 based on, e.g., application data 128, metadata 130, sensor data 132, statistical data 134, and/or any other available information. In some embodiments, the state recognizer 118 may switch one or more settings of the mobile device 100 to settings associated with a particular state when a state of the device is determined. For example, the state recognizer 118 may influence a polling rate associated with the one or more sensors in a sensor group 102 based on a determined state. The state recognizer 118 may employ a variety of suitable analytical tools to determine the state of the device 100 including, without limitation, some or all of fuzzy logic, neural networks, user behavior and/or activity inference tools, and/or regression tools. Other suitable tools and/or techniques may also be utilized by state recognizer 118 to determine a state of the device 100.

The application manger 120 may be configured to monitor one or more user activities being performed using one or more applications installed and/or executing on the mobile device 100. In some embodiments, the application manager 120 may generate metadata associated with one or more applications. For example, the application manager 120 may generate metadata associated with one or more websites browsed by a user of the device 100. In some embodiments, application manager 120 may store the metadata associated with the one or more applications as application data 128 in the program data partition 114.

The metadata generator 122 may, for example, be configured to generate metadata associated with sensor data 132. For example, the sensor data 132 may include coordinates of a location of the mobile device 100, and the metadata generator 122 may determine a name of a place associated with the coordinates of the location. In some embodiments, the metadata generator 122 may store the metadata 130 in the program data partition 114. In certain embodiments, the metadata generator 122 may interface with one or more databases and/or services (e.g., databases associating geographic locations with particular places) in generating metadata 130.

The data analyzer 124 may, for example, be configured to generate and/or update statistical data 134 based on sensor data 132, metadata 130, and/or application data 128. In some embodiments, the statistical data 134 may comprise a historical pattern of sensor data 132, metadata 130, application data 128, and/or any other relevant data. In further embodiments, statistical data 134 may include, without limitation, information regarding prior states of the mobile device 100, time spent in certain prior states of the mobile device 100, historical patterns of the set of parameters acquired by the sensor group 102, polling rates associated with each sensor in the sensor group 102 for the one or more prior states, user activity data, and/or the like. In certain embodiments, the data analyzer 124 may comprise various analytical tools including, without limitation, clustering tools and/or regression tools that may be used to generate and/or update the statistical data 134.

The resource manager 126 may be configured to monitor the power resource 106 and generate control data associated therewith. In some embodiments, the resource manager 126 may store the control data as sensor data 132. Control data may be utilized by the sensor manager 116 to, among other things, vary a frequency of the clock 108. In certain embodiments, the sensor manager 116 may vary a frequency of the clock 108 based on application data 128, metadata 130, sensor data 132, statistical data 134, other available state information, control data, and/or the like.

It will be appreciated that a number of variations can be made to the architecture and relationships presented in connection with FIG. 1 within the scope of the inventive body of work. For example, certain functionalities described above may be integrated into a single system, component, executable software module, and/or any suitable combination thereof in any suitable configuration. Thus, it will be appreciated that the architecture of the device 100 of FIG. 1 is provided for purposes of illustration and explanation, and not limitation.

Figure 2:
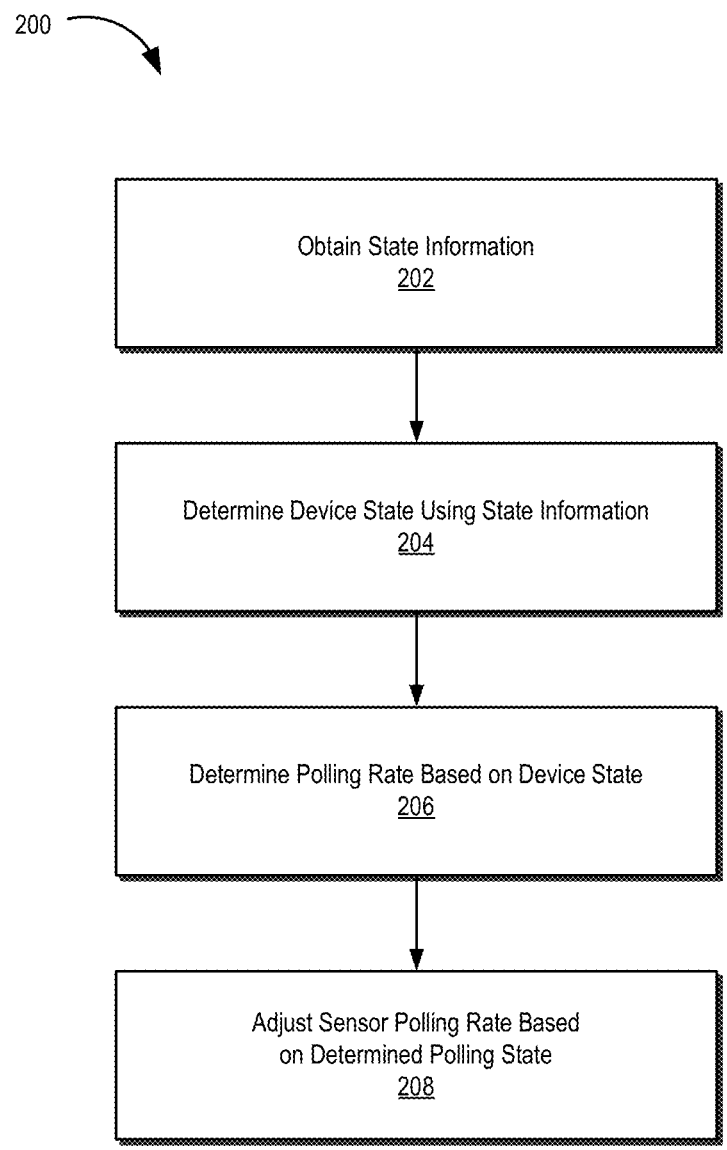
FIG. 2 illustrates a flow chart of an exemplary method for managing a resource of a mobile device consistent with embodiments of the present disclosure.

FIG. 2 illustrates a flow chart of an exemplary method 200 for managing a resource of a mobile device consistent with embodiments of the present disclosure. The illustrated method 200 may be implemented in a variety of ways, including using software, firmware, hardware, and/or any combination thereof. In certain embodiments, the method 200 may be implemented by a device including some and/or all of the components of the mobile device illustrated and described in reference to FIG. 1.

At 202, device state information may be obtained. Device state information may be obtained from a variety of sources. Device state information may include, without limitation, parameters measured by one or more sensors associated with the device (e.g., information retrieved from device location, light, and/or orientation sensors, etc.), information derived from a user's interactions with and/or activities using the device (e.g., user-volunteered information, information obtained by monitoring a user's activities using one or more applications executing on the device, etc.), input relating to a device state provided by a user, personal information relating to a user (e.g., gathered and/or maintained by a personal agent associated with the device and/or user), information generated using one or more predictive methods utilizing prior device activity and/or user behavior, and/or any other suitable type of information that may be used to indicate and/or infer a state of the device. In some embodiments, state information may be obtained using one or more systems and/or sensors of the device. In further embodiments, state information may be obtained by one or more separate systems associated with the device (e.g., a trusted aggregator of personal information and/or the like). It will be appreciated that there are a variety of other types of information that may be utilized in determining a state of the device, and that for purposes of practicing the systems and methods disclosed herein, any type of information indicative of a state of a device from any suitable source may be used.

At 204, a state of the device may be determined based at least in part on the state information obtained at 202. A state of the device may be determined in a variety of ways. In certain embodiments, a state of a device may be determined directly from state information. For example, state information comprising a user input or indication regarding device state (e.g., an indication from the user for the device to enter a sleep mode) may be utilized to directly determine an associated device state (e.g., a device sleep or hibernation state).

In further embodiments, a state of the device may be determined indirectly and/or inferred from available state information. In some embodiments, location and/or orientation-based measured parameters may provide contextual information that may be used to determine and/or infer an associated device state. For example, if a device location sensor measures coordinate parameters that indicate that a user is in a movie theater, and a device orientation sensor measures parameters associated with the device being located in the user's pocket, it may be inferred from such state information that the user is watching a movie. Accordingly, the device state may be determined to be in an associated "movie state", whereby certain device functions may be restricted and/or polling rates of device sensors and/or systems may be reduced.

Similarly, a state of a device may be determined based on inferences drawn from a user's interactions with and/or activities using the device. For example, a user may indicate via an application of the device (e.g., a social networking application) information regarding their location and/or an activity being performed using the device (e.g., "at the office", "going to the movie", "playing a game", etc.), and a state of the device may be inferred based on such an indication. Similarly, a user may indicate in a calendar or scheduling application that they will be travelling on an airplane and/or on a certain flight for a certain period of time. Based on such information, it may be determined that the device is in an "air travel state" during such travel periods. It will be appreciated that a wide variety of inferences may be drawn based on a wide variety of device interactions and/or activity state information, and that any suitable method, algorithm, and/or architecture for drawing such inferences to determine device states may be utilized in connection with the embodiments disclosed herein.

As users interact with devices and/or services, personal information related to the user may be obtained. In certain embodiments, this personal information may reflect in part the interests and/or behavior patterns of the user. Personal information may be provided by a user and/or be generated based on the user's activities. For example, a user may provide a device with personal identification information (e.g., age, gender, and the like), and/or content preference or other interest-based information (e.g., preferred genres, artists, and the like). Similarly, a client device may passively collect personal usage information regarding a user's interactions with a device (e.g., interactions with one or more applications executing on the device, location-based user behavior, etc.). Collectively, personal information may include, without limitation, user attributes such as gender, age, content preferences and/or interests, geographic location, attributes and information associated with a user's friends, contacts, and groups included in a user's social network, and/or information related to a user's temporal and spatial travel patterns (e.g., a user's schedule, points of interest, etc.), information about the user or the user's environment (e.g., time of day, GPS coordinates, etc.), certified attributes, and/or the like.

In some embodiments, personal information may be gathered, managed, maintained, and/or stored locally on a client's device. In further embodiments, personal information may be gathered, managed, maintained, and/or stored by a remote trusted third-party. In certain embodiments, personal information may be shared and/or aggregated between systems and devices to build a user personal information profile.

Personal information may be collected, stored, maintained, and/or managed by a personal agent, such as that described in the '406 application, operating locally on a user's device and/or on a trusted remote system. For example, a personal agent may be implemented as an agent that runs locally on a device such as a background service configured to monitor events and collect information from a variety of sources including, for example, direct user input, user contents, user actions, web browsing and/or searches, and/or the like. In further embodiments, a personal agent may be implemented as a network service that interacts with services (e.g., social networks and/or the like) and collects information related to a user's profile, friends, groups, recommendations, and/or the like.

Personal information (e.g., information maintained by a personal agent) may be utilized as state information for purposes of determining a state of the device consistent with embodiments disclosed herein. For example, personal information included as part of a user profile may indicate that a user has an interest in fitness and goes to a gym regularly. Such information may be utilized to infer that a user is working out when a device location sensor measures coordinate parameters that indicate the device and/or user is located in a gym. Based on such an inference, an associated device state may be determined (e.g., a state associated with a user's workout or the like).

In some embodiments, a plurality of different types of state information may be used to determine a state of the device. For example, measured parameters from one or more location-based sensors (e.g., measurements indicating the device is stationary), and information from one or more device applications (e.g., a clock application indicating the current time is 3:00 AM, a scheduling application indicating the user intends to sleep, etc.), may be used to determine a device state. In certain embodiments, utilizing a plurality of different types of state information may enable a device to more accurately infer a state of the device. For example, if a location sensor indicates a device is located at a university and is generally stationary, and personal information regarding a user of the device indicates that the user is a student at the university, it may be more accurately inferred in determining a device state that the user is in a class at the university than if these types of state information were used in isolation in the state determination process.

Device states may be pre-defined and/or programmed in a device at the time of manufacture, may be defined by a user, and/or be dynamically generated by programming on, or services connected to, the device as a user interacts with the device and/or services. For example, device states may be defined by a user by associating certain state information with certain device states. In some embodiments, device states may be dynamically generated based, for example, on monitored user and/or device behavior. For example, one or more power resource optimization states (e.g., states designed to increase power resource utilization) may be defined based on historic device usage by a user (e.g., activity patterns, usage patterns, and/or the like).

In certain embodiments, a device state may be determined at 204 utilizing a look-up table and/or other suitable data structure associating state information and/or inferences drawn therefrom with one or more device states. In further embodiments, machine learning and/or heuristic techniques and/or algorithms may be utilized to identify a device state from available state information. It will be appreciated that a variety of methods may be utilized in determining a state of the device at 204, and that for purposes of practicing the systems and methods disclosed herein, any method for determining a device state from available state information may be used.

At 206, a polling rate of one or more sensors may be determined based on the device state determined at 204. In some embodiments, a polling rate may be a sampling frequency at which data is acquired from one or more sensors in the device. As discussed above, a particular device state may have one or more associated polling rates for one or more device sensors. Different device states may have different associated sensor polling rates. For example, a "navigation state" for a device may be associated with a relatively high GPS sensor polling rate, whereas a "hibernation state" for the device may be associated with a relatively low GPS sensor polling rate. Such polling rates may be associated with a sensing resolution and/or frequency for the device to perform effectively in a particular device state.

A polling rate of the device may be determined based on a device state in a variety of ways. For example, in some embodiments, a lookup table and/or other suitable data structure associating one or more device states with one or more defined polling rates may be utilized. In certain embodiments, information utilized in making the determination at 206 (e.g., information associating device states and polling rates) may be stored by a user's device. In further embodiments, such information may be obtained from one or more remote systems. It will be appreciated that a variety of methods may be utilized in determining polling rates for one or more sensors associated with a particular device state at 206, and that for purposes of practicing the systems and methods disclosed herein, any method for determining a polling rate based on a device state may be used.

In some embodiments, polling rates associated with particular device states may be pre-defined and/or programmed in a device at the time of manufacture, may be defined by a user, and/or may be dynamically generated. For example, polling rates may be defined by a user by associating certain polling rates with certain device states. In further embodiments, polling rates may be dynamically defined. For example, polling rates may be defined based on monitored user and/or device behavior. For example, one or more polling rates may be defined and associated with particular device states based on historic device usage by a user (e.g., activity patterns, usage patterns, and/or the like).

In some embodiments, a polling rate determined at 206 may be location dependent. That is, a polling rate of a sensor associated with a particular state may vary based on a location of the device. For example, in a "navigation state" of a device (e.g., a state based on state information indicating the device is traveling and the user is using a navigation application), an associated polling rate of a GPS sensor may be higher in an urban area than in a rural area along a highway with no major exits. In this manner, polling rates associated with navigation states may vary based on a device's particular dynamic environment, and additional power resource utilization savings may be realized.

In certain embodiments, polling rates and/or device states may be device resource dependent. That is, a determined device state and/or polling rate may further depend on a state and/or level of a resource of the device. For example, a device state and/or associated polling rate for a device having a low battery level may be different than a device state and/or associated polling rate for a device having a high battery level. In this manner, polling rates may further depend on the availability of device resources.

At 208, a polling rate one or more device sensors may be adjusted based on the polling rate identified at 206. For example, if a device is in a "hibernation state", a polling rate of one or more location based-sensors may be adjusted so that less frequent location polling events are performed. By performing less frequent polling events when a device state allows it, power resources of the device may be better utilized.

Alternatively and/or in addition to adjusting a polling rate at 208, in some embodiments, one or more polling events may be scheduled based on determined device states, device state changes and/or identified polling rates. For example, as discussed in more detail below in reference to FIG. 6 and FIG. 7, state change information and/or other available information may be utilized to schedule one or more future sensor polling events based, at least in part, on a determined state of the device.

Method 200 may be initiated by a change in state information (e.g., a change in device location, speed of travel, orientation, etc.). In certain embodiments, any change in available state information may initiate method 200. In further embodiments, a change in available state information by a particular amount (e.g., a triggering threshold amount) may initiate method 200. For example, a change in state information by a small amount may not result in a change of state of the device and, accordingly, a change in sensor polling rate may not necessarily need to be evaluated. If a change in state information is significant enough to result in a change of device state, however, an evaluation of the device state and/or an adjusted polling rate may be performed using method 200. In yet further embodiments, a user indication (e.g., a user issuing a command to the device to enter a particular state) and/or a scheduled device event (e.g., a device state update check event or the like) may initiate method 200. Any other suitable event and/or indication may also be utilized to initiate method 200 in accordance with some embodiments.

FIG. 3 illustrates an exemplary data structure 300 for maintaining certain statistical data (e.g., state information, polling rate information, etc.) consistent with embodiments of the present disclosure. Although illustrated as a table data structure, any suitable structure including a variety of constituent components may be utilized by the systems and methods disclosed herein. The illustrated data structure 300 comprises one or more data fields or columns 302-310. In some embodiments, the exemplary data structure 300 may comprise a table that includes column 302 associated with a time interval (e.g., 12:00 AM-7:00 AM 312). The data structure 300 may further include a column 304 that specifies a set of parameters captured by one or more sensors during a time interval specified in column 302. For example, one or more sensors may capture parameter 1 314, parameter 2 316, and parameter 3 318 during time interval 312 (e.g., 12:00 AM-7:00 AM).

The data structure 300 may include a column 306 that includes a state of the device associated with corresponding parameters in column 304 (e.g., "sleep state 320). In some embodiments, the data structure 300 may include a column 308 that includes one or more sensors (e.g., sensor 1 322, etc.). In further embodiments, the data structure 300 may include column 310 that includes a polling rate associated with sensors included in column 308 for an associated state indicated in column 306. For example, as illustrated, sensor 1 322 may have a polling rate 't1' 324 when the mobile device is operating in a "sleep state" 320.

In certain embodiments, data structure 300 may, among other things, be utilized to maintain state information and/or associate particular states with particular sensor polling rates. Data structure 300 may further be utilized to maintain statistical data including, without limitation, one or more prior states, time spent in one or more prior states, polling rates associated with each of the one or more sensors for the one or more prior states, historical measurement parameters, device usage patterns, user activity data, and/or any other data relating to state information. A variety of variations can be made to the architecture and relationships presented in connection with data structure 300 within the scope of the inventive body of work. Thus, it will be appreciated that the architecture of the data structure 300 of FIG. 3 is provided for purposes of illustration and explanation, and not limitation.

Figure 4:
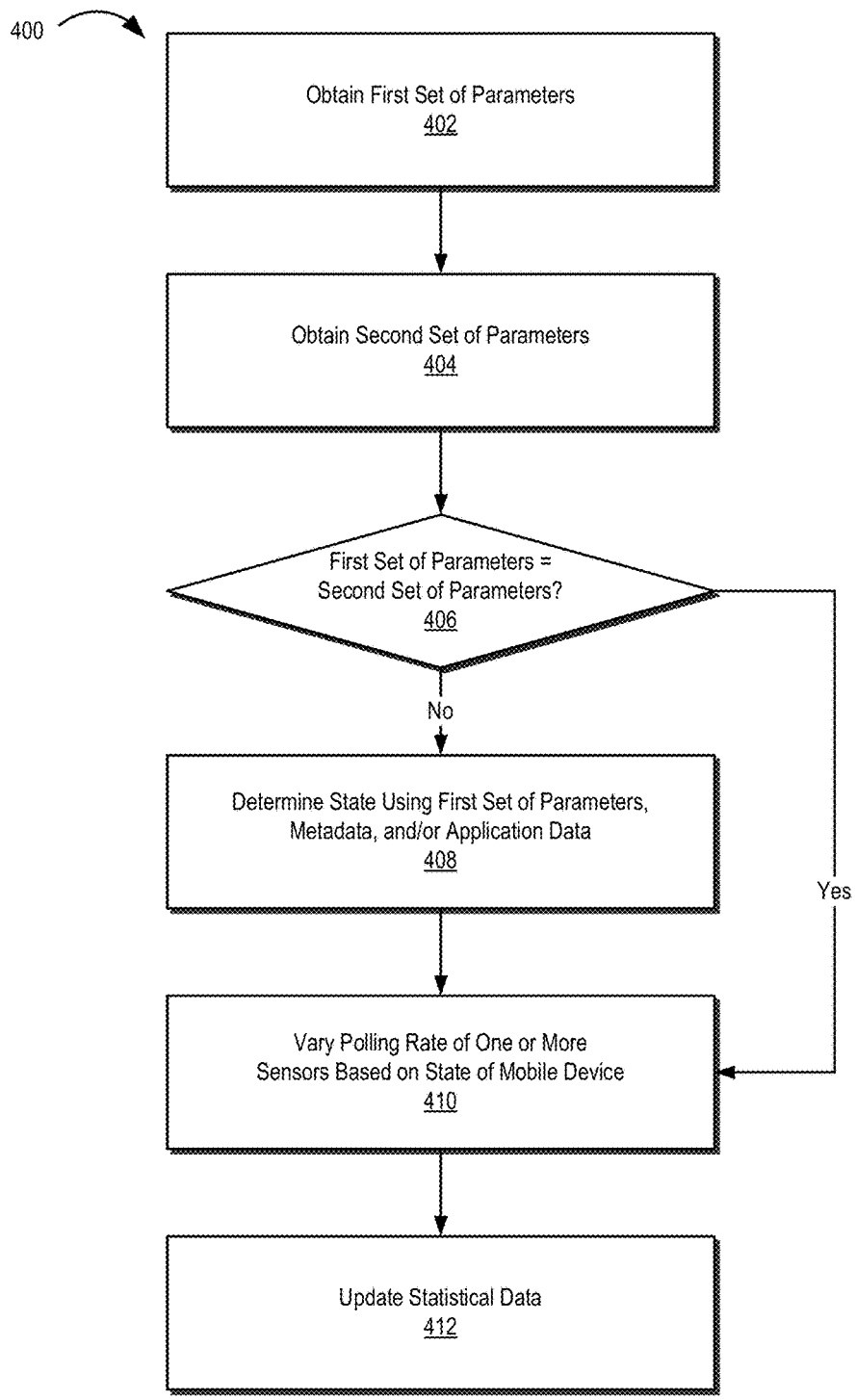
FIG. 4 illustrates a flow chart of another exemplary method for managing a resource of mobile device consistent with embodiments of the present disclosure.

FIG. 4 illustrates a flow chart of another exemplary method 400 for managing a resource of a mobile device consistent with embodiments of the present disclosure. The illustrated method 400 may be implemented in a variety of ways, including using software, firmware, hardware, and/or any combination thereof. In certain embodiments, the method 400 may be implemented by a device including some and/or all of the components of the mobile device illustrated and described in reference to FIG. 1.

At 402, a first set of parameters and/or other state information associated with a device may be obtained. In certain embodiments, the first set of parameters and/or other state information may be measured by one or more sensors associated with the device. In some embodiments, the first set of parameters and/or other state information may be measured by one or more power-efficient sensors of the device. In further embodiments, the first set of parameters and/or other state information may be received from the one or more sensors by a sensor manager executing on the mobile device. Thereafter, the sensor manager may store the first set of parameters and/or other state information as sensor data. In further embodiments, the first set of parameters and/or other state information may be extracted from sensor data.

At 404, a second set of parameters and/or other state information may be obtained from statistical, historical, or other data associated with the device. In certain embodiments, the second set of parameters and/or other state information obtained from the statistical, historical, or other data may be indicative of a prior state of the device. The data may, for example, comprise one or more prior states, time spent in one or more prior states, polling rates associated with each of the one or more sensors for the one or more prior states, user activity data, and/or the like. In some embodiments, the statistical, historical, or other data can be updated based on sensor data. In certain embodiments, the second set of parameters may be extracted from the data by a data analyzer executing on the mobile device. In further embodiments, the second set of parameters may be extracted by the data analyzer based on a time interval. For example, referring to the exemplary data structure illustrated in FIG. 3, if one or more sensors measures the first set of parameters between time interval 12:00 AM-7:00 AM, the data analyzer may extract parameter 1, parameter 2, and parameter 3 from the data structure as the second set of parameters.

At 406, the first set of parameters and the second set of parameters and/or other associated state information may be compared (e.g., compared by the data analyzer). In certain embodiments, the first and second set of parameters may be compared to determine if they are similar (e.g., if they are identical or differ within a threshold amount). In some embodiments, comparing the first set of parameters and the second set of parameters and/or other associated state information may identify whether a state of the device has changed. If the first set and second set of parameters are similar, the method may proceed to 410, where a state associated with the mobile device may be extracted and a polling rate associated with one or more sensors may be varied based on the state. In certain embodiments, if it is determined that the first set and second set of parameters are similar, then a state of the device may be maintained and a polling rate of one or more sensors of the device may not be adjusted.

If the first and second parameters are not similar (e.g., not identical or differ more than a threshold amount), the method may proceed to 408, where an updated state of the device may be determined using, without limitation, the first set of parameters, metadata, application data, and/or any other available state information and/or data. In certain embodiments, the metadata may be generated by an application manager based on one or more activities performed by a user on a device (e.g., activities on one or more applications executing on the user's device). For example, if the user has posted a status update on a social networking application running on a mobile device that says "office is hectic", the application manager may generate and store metadata associated with the social network application that includes the term "office". Such metadata information may be used to determine that a state of the device corresponds to a state associated with the device being located in a user's office location.

In some embodiments, the first set of parameters may be extracted by a metadata generator from sensor data. The metadata generator may further generate metadata associated with the first set of parameters. For example, if the first set of parameters includes a location of the device (e.g., coordinates of the device), the metadata generator may identify a name of a place associated with the location (e.g., using one or more business databases including location information and/or the like).

A state recognizer may switch the device to the determined state. The state recognizer may further adjust a polling rate of one or more sensors based on the determined state. For example, if the state of the device is determined to be a "navigation state", the state recognizer may define a polling rate that allows a GPS sensor in the device to capture GPS data as frequently as appropriate for navigation from a first location to a second location using the device.

A sensor manager may vary the polling rate of the one or more sensor groups based on the polling rate determined based on the state of the device. In some embodiments, the sensor manager may vary the polling rate of one or more sensors based on control data generated by a resource manager. In certain embodiments, the control data may be indicative of one or more power levels of the power resource. If, for example, the control data indicates that the power resource has a power level below a threshold (e.g., a minimum power threshold to sustain operation of the device for a predefined time period), then, in some embodiments, the sensor manager may, for example, deactivate one or more sensors. The one or more sensors may be reactivated when the control data indicate a power level above the same or a different threshold.

Referring once again to FIG. 4, at 412 statistical data may be updated based on a state determined at 410. In certain embodiments, a data analyzer may update the statistical data based on a state determined by a state recognizer.

Figure 5:
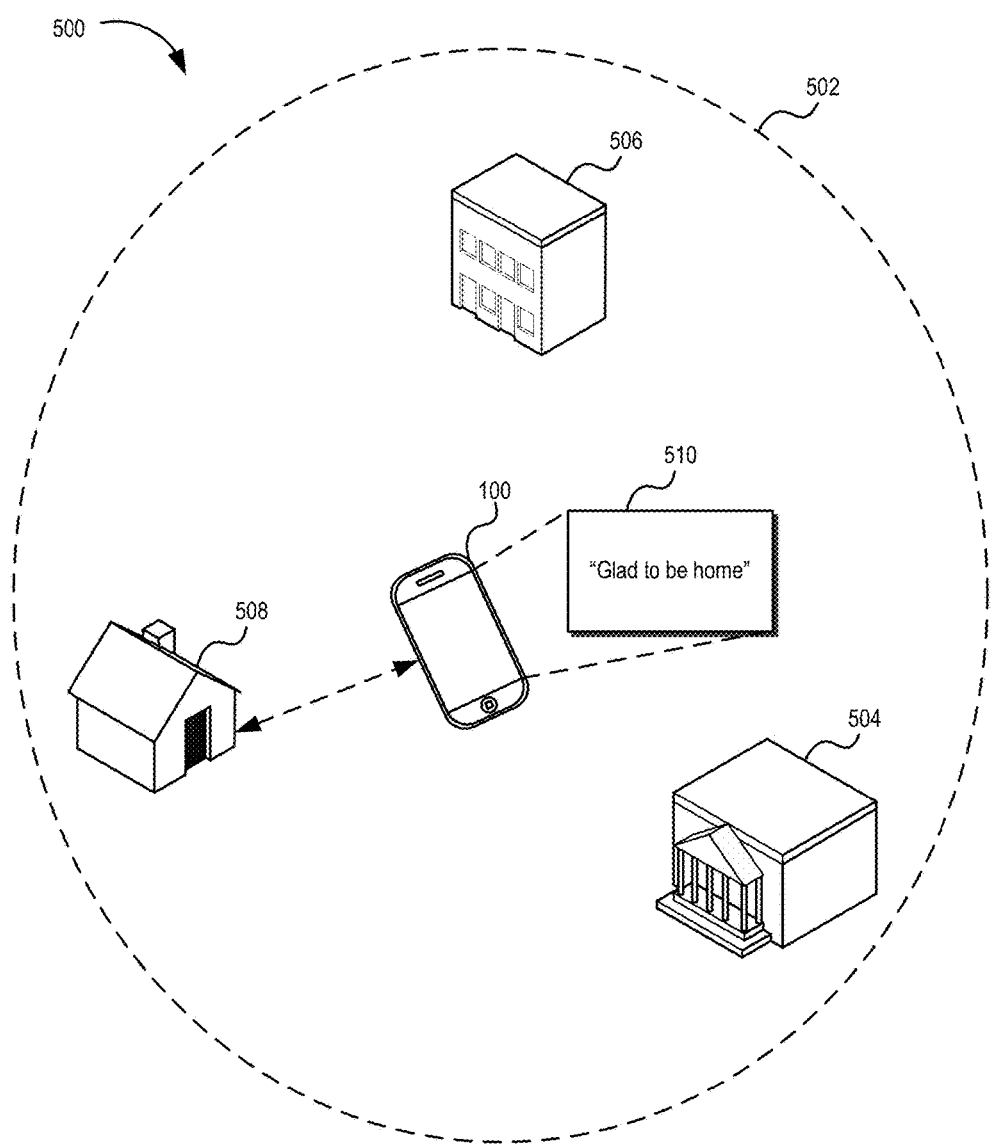
FIG. 5 illustrates a conceptual diagram illustrating state determination utilizing a variety of state information consistent with embodiments of the present disclosure.

FIG. 5 illustrates a conceptual diagram illustrating state determination for a mobile device 100 utilizing a variety of available state information consistent with embodiments of the present disclosure. In certain embodiments, a location-based sensor such an A-GPS sensor may provide a location of a device within a particular geographic area 502 of a region 500 (e.g., a rough location). In some embodiments, the size of the geographic area 502 may depend, at least in part, on an accuracy of a location-based sensor. A more accurate sensor may provide a smaller geographic area 502, whereas a less accurate sensor may provide a larger geographic area 502. For example, based on location information provided by connecting to a particular cellular communication tower, it may be determined that a mobile device is within a relatively large geographic area 502 proximate to the cellular tower (e.g., the range of the cell tower). However, based on location information provided from, for example, a differential GPS sensor, device 100 may be determined to be within a relatively small geographic area 502.

As discussed above, in certain embodiments, a state of a device 100 may be determined based, at least in part, on location information (e.g., geographic area 502). In certain circumstances, an identified geographic area 502 may be of high-enough resolution to identify a single location and/or point of interest associated with the device 100. In such embodiments, the state of the device 100 may be set to a state associated with the location, and polling rates for one or more sensors may be adjusted accordingly.

In other circumstances, however, a plurality of locations may be included within an identified geographic area 502. For example, as illustrated, an office 504, a restaurant 506, and/or a home 508 may be located within the identified geographic area 502. Different locations may be associated with different device states and, accordingly, in some circumstances it may be difficult to determine an appropriate device state based solely on an identified geographic area 502.

In some embodiments, if a plurality of locations exist within the geographic area 502 (e.g., office 504, restaurant 506, and/or home 508), additional state information (e.g., statistical data, metadata, device activity and/or usage information, and/or the like) may be utilized in conjunction with location information to determine a state of the device. In certain embodiments, utilizing a plurality of different state information may enable a device to more accurately infer and/or determine a state of the device 100. For example, if a location sensor indicates a device 100 is located within a geographic area 502 that includes an office 504, restaurant 506, and home 508, and device activity state information indicates that a user has posted information on a social networking application that says "In restaurant, enjoying good food", then it may be inferred the device 100 is associated with the restaurant location 506 and an associated device state and/or polling rate of one or more device sensors may be determined. For example, a "restaurant state" may be associated with the device 100, and various sensors, such as a GPS sensor, may be set to a lower polling rate (e.g., set so that the GPS sensor does not capture data frequently) while in the "restaurant state". In alternative embodiments, one or more sensors may be deactivated based on a determined state of the device 100.

In another example, if a location sensor indicates a device is located within a geographic area 502 that includes an office 504, restaurant 506, and home 508, and device activity state information indicates that a user has sent a message 510 (e.g., a text message) using a messaging application that says "Glad to be home", then it may be inferred the device 100 is associated with the home location 508 and an associated device state and/or polling rate of one or more device sensors may be determined and adjusted.

In certain embodiments, a device 100 may transmit certain state information to a content and/or ad server (not shown). Based on the state information, the content server may, among other things, transmit relevant content to the device 100. For example, the one or more sensors in the device 100 may measure state information indicative of a location of the device 100 (e.g., a department store). The content server may transmit advertisements or offers, relating to the department store to the device. In another example, a user of the device 100 may be watching a sports event on a television at home. The one or more sensors of device 100 (e.g., a microphone) can be configured to capture background noise of a TV to identify a sports event being watching by a user. The content server may then transmit advertisements or offers related to the sports event to the user's device 100.

In some embodiments, a user of the mobile device 100 may have an option to override an automatic state determination of the mobile device 100 based on one or more preferences. For example, if the user of the mobile device 100 is in their office 504, and the mobile device 100 is in the "office state" where a location-based sensor of the mobile device is inactive, a user may override such state-controlled sensor activity to cause the location-based sensor of the device 100 to become active.

Figure 6:
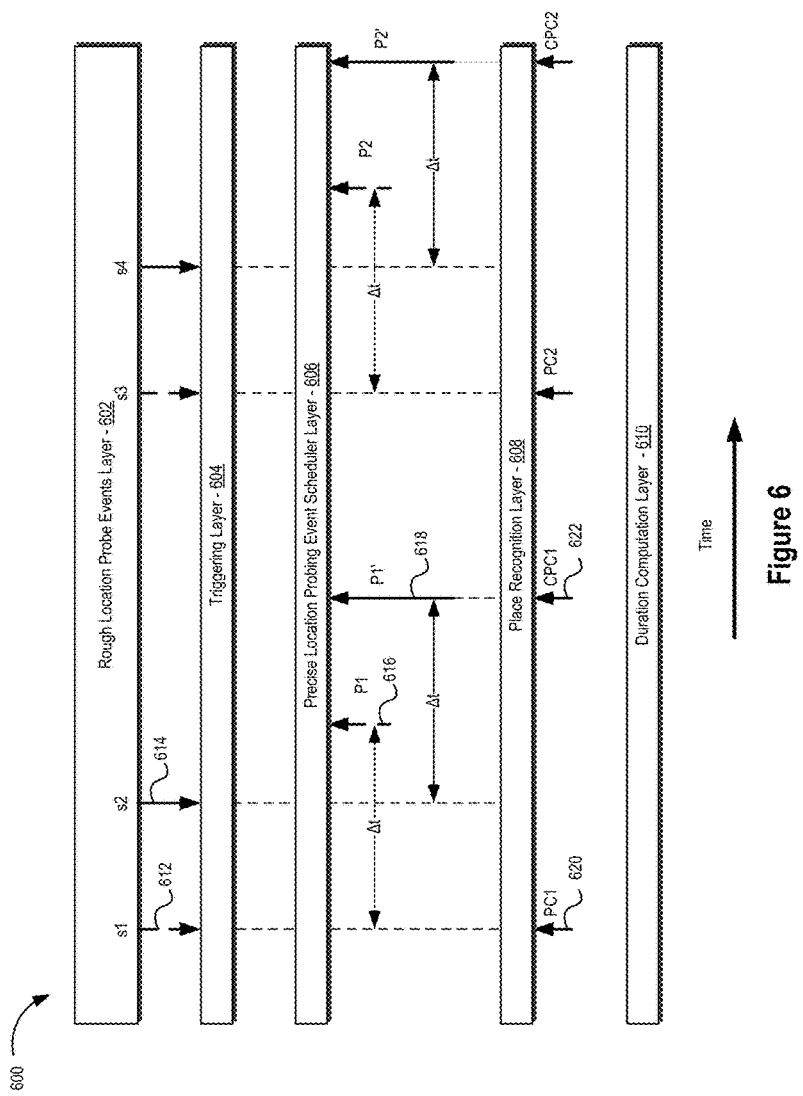
FIG. 6 illustrates a method for scheduling location polling events by a mobile device consistent with embodiments of the present disclosure.

FIG. 6 illustrates a conceptual diagram 600 illustrating a method for scheduling location polling events 616, 618 by a mobile device consistent with embodiments of the present disclosure. As discussed above, one or more sensors of a mobile device may consume device resources when utilized. For example, utilizing one or more precise location sensors, such as a GPS sensor, may consume power resources of a mobile device (e.g., battery resources). By performing less frequent GPS sensor polling events when a device state allows it, power resources of the device may be better utilized. As used herein, the term polling and/or probe event may refer to an instance of data acquisition by one or more device sensors. For example, a GPS sensor polling event may refer to an event in which a GPS sensor system acquires certain location coordinates of a mobile device by communicating with an associated satellite system and/or network.

In certain embodiments, one or more one or more polling events may be scheduled based on determined device states, device state changes, and/or identified polling rates. As discussed in more detail below, polling events of less-power efficient sensor systems (e.g., GPS sensors) may be scheduled based on information obtained from polling events measured by one or more power efficient sensor systems (e.g., sensors indicating approximate cell tower proximity). In some circumstances, precise location information obtained by less-power efficient sensor systems (e.g., GPS systems) may be less useful in determining a state of a device when the device is transitory between locations and/or points of interests. By relying on power efficient sensor systems to schedule polling events of more precise sensor systems that consume more power at times when the sensor systems are more likely to provide location data useful in determining a device state, power resources of the device may be better utilized.

In some circumstances, a user and/or an associated device may move between a set of locations and/or points of interest (e.g., between home, work, school, etc.). A transitional location associated with a device (e.g., a location in which a device merely passes by) may be differentiated from a visited location (e.g., a point of interest) based on a time spent in the location. As noted above, precise location information obtained by less-power efficient sensor systems (e.g., GPS information) may be less useful in determining a location-based state of a device when the device is transitory between locations and/or points of interests (e.g., located at a transitional location), but may be particularly useful in determining device state when a device is at a visited location and/or point of interest. Systems and methods disclosed herein may utilize one or more relatively power-efficient systems to determine when a device is in transition and to schedule a precise sensor polling event at a time when the device is more likely to be located at a visited location and/or point of interest. In certain embodiments, the one or more power-efficient systems may comprise one or more location-based sensor systems and/or systems that provide information that may be used to infer a location of the device.

The conceptual diagram 600 illustrated in FIG. 6 includes multiple layers performing functions associated with polling event scheduling and execution. As illustrated, the diagram 600 may include a rough location probe event layer 602, a triggering layer 604, a precise location probing event scheduler layer 606, a place recognition layer 608, and/or a duration computation layer 610. These layers are discussed in more detail below.

The rough location probe event layer 602 may provide triggering layer 604 information regarding one or more rough location probe events (e.g., s1 612, s2 614, s3, and/or s4 as illustrated). Although described herein as "rough" location probe events that may be less accurate in determining location than a precise location probe event, it will be appreciated that in other embodiments, any type of location probe event indicating a specific location and/or a change in location, including precise location probe events, may be utilized in scheduling further location probing events. In further embodiments, other state information (e.g., device use and/or activity information) indicative of a location and/or a change of location may be utilized in scheduling precise sensor polling events. For example, a user may indicate via a social networking application and/or via a calendar application that they are leaving a particular location at a particular time. Based on such information, one or more future sensor probe events may be scheduled.

Rough location probe events (e.g., s1 612, s2 614, s3, and/or s4) may be indicative of a particular device location (e.g., as measured by one or more rough location sensors) and may include location coordinate information. In further embodiments, rough location probe events may be indicative of a change in device location. In certain embodiments, rough location probe events may indicate that a mobile device has disconnected and/or switched from one or more connected networks. For example, a cellular device may provide an indication that the device has switched to a different cellular tower (indicating the device is transitory) as a rough location probe event. Similarly, a mobile device may provide an indication that the device is out of range of a previously connected wireless network (indicating that the device has moved) as a rough location probe event. A rough location probe event may comprise a variety of events and/or information, and any suitable event and/or information relating to a location of the device may be used to schedule location probing events in connection with the embodiments disclosed herein.

In some embodiments, rough location probing events may be provided by rough location probe event layer 602 as a callback from a device operating system ("OS") (e.g., by a location callback function of a device OS and/or the like). For example, a callback function may be triggered when a device has varied from a prior location by a particular margin (e.g., over 500 m) and, in response, a rough location probing event may be provided by rough location probe event layer 602. Similarly, a callback function of a device OS may be triggered when a mobile device switches cellular towers and/or wireless networks, and a rough location probing event may be provided in response.

In some embodiments, rough location probing events may consume less power than precise location probing events. Accordingly, rough location probing events may be used to determine when a device is in transition and to schedule a precise location polling event that may consume more power at a time when the device is more likely to be located at a visited location and/or point of interest (e.g., not transitioning between locations and/or points of interest).

Referring to FIG. 6, a rough location probing event s1 612 may be provided to triggering layer 604 and/or precise location probing event scheduler layer 606. The rough location probing event s1 612 may, for example, be generated in response to an OS callback function indicating that the device has switched cellular towers and thus changed location. In some embodiments, a place recognition layer 608 may determine that the rough location probing event s1 612 indicates that the device is located at a particular location and/or point of interest PC1 620.

The triggering layer 604 and/or precise location probing event scheduler layer 606 may schedule a precise location probing event P1 616 at a time Δt following rough location probing event s1 612. The time at which precise location probing event is scheduled (i.e., Δt) may depend on a variety of factors and be determined using a variety of methods. In some embodiments, the time Δt may be determined based on a historical analysis of information relating to prior device movement. For example, in some embodiments, a duration computation layer 610 or other functional layers may determine an average duration of prior times during which the device has been transitory between locations and/or points of interest, and may utilize the average duration as time Δt for scheduling precise location probing events.

In further embodiments, the time Δt following a particular rough location probe event used to schedule a precise location probe event may depend on a location associated with the rough location probe event. For example, if a rough location probe event comprises information indicating a user is leaving a location that is relatively far from other locations and/or points of interests (e.g., locations frequented by a user of the device), Δt may be longer than it would be if a user is leaving a location that is relatively close to other locations and/or points of interest. In this manner, Δt may be adjusted to reflect a predicted and/or likely travel time between locations and/or points of interest.

Duration computation layer 610 and/or any other suitable functional layer may help determine an appropriate time Δt used to schedule a precise location probe events based on a variety of suitable analytical and/or predictive methods. In further embodiments, one or more inference, machine learning, and/or behavior predictive heuristic methods and/or algorithms may be utilized. It will be appreciated that there are a variety of techniques for determining a time Δt used to schedule a precise location probe events, and that for purposes of practicing the systems and methods disclosed herein, any suitable technique may be used.

In some circumstances, prior to performing a scheduled precise location probing event, a subsequent rough location probe event may be provided to triggering layer 604 and/or precise location probing event scheduler layer 606 by the rough location probe events layer 602. For example, referring to FIG. 6, after scheduling precise location probe event P1 616 based on rough location probe event s1 612 but prior to performing scheduled precise location probe event P1 616, the rough location probe event layer 602 may provide the triggering layer 604 and/or the precise location probing event scheduler layer 606 with a subsequent rough location probe event s2 614.

Based on receipt of subsequent rough location probe event s2 614, the precise location probing even scheduler layer 606 may cancel the previously scheduled precise location probe event P1 616. For example, the rough location probe event s2 614 may indicate that the device may still be transitory. The triggering layer 604 and/or precise location probing event scheduler layer 606 may schedule a new precise location probing event P1' 618 at a time Δt following rough location probing event s2 614. In some embodiments, time Δt following rough location probing event s2 614 may be different than time Δt following rough location probing event s1 612. If time Δt elapses without any further rough location probe events occurring, the precise location probing event P1' 618 may occur at the scheduled time, and the device may direct an associated precise location sensor (e.g., a GPS sensor or the like) to obtain a location and/or location coordinates of the device. In some embodiments, such precise location information and/or coordinates may be utilized by a place recognition layer 608 to determine that the device is located at a particular location and/or point of interest CPC1 622.

Figure 7:
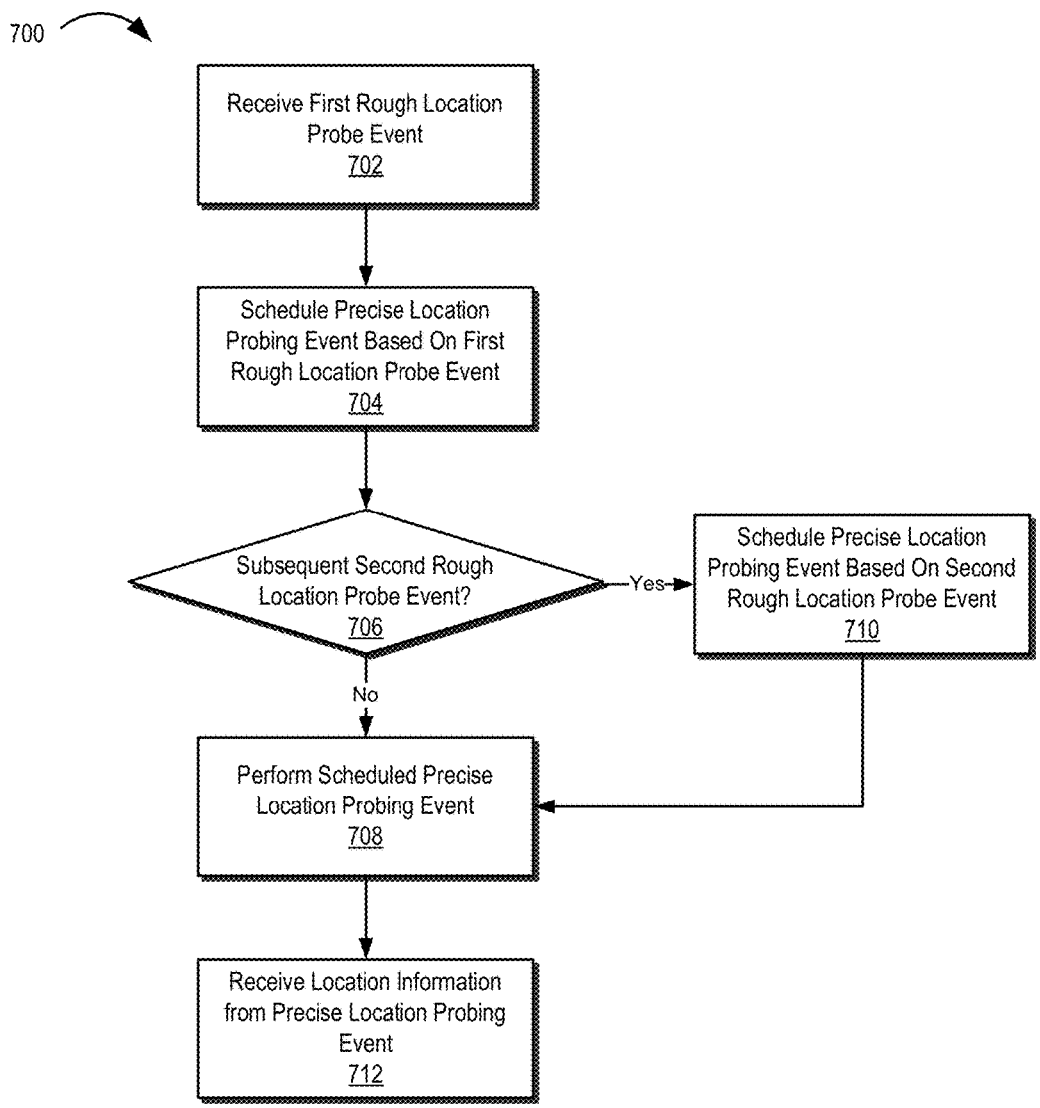
FIG. 7 illustrates a flow chart of an exemplary method for scheduling location polling events by a mobile device consistent with embodiments of the present disclosure.

FIG. 7 illustrates a flow chart of an exemplary method 700 for scheduling location polling events by a mobile device consistent with embodiments of the present disclosure. The illustrated method 700 may be implemented in a variety of ways, including using software, firmware, hardware, and/or any combination thereof. In certain embodiments, the method 700 may be implemented by a device including some and/or all of the components of the mobile device illustrated and described in reference to FIG. 1. In further embodiments, the method 700 may be implemented using one or more functional layers including some and/or all of the functional layers illustrated and described in reference to FIG. 6.

At 702, a first rough location probe event may be received. In certain embodiments, the rough location probe event may be received from a more power-efficient sensor and/or system of a mobile device. As discussed above, rough location probe events may be indicative of a particular device location (e.g., as measured by one or more rough location sensors) and may include location coordinate information. In further embodiments, rough location probe events may be indicative of a change in device location. In certain embodiments, rough location probe events may indicate that a mobile device has disconnected and/or switched from one or more connected networks. For example, a cellular device may provide an indication that the device has switched to a different cellular tower (indicating the device is transitory) as a rough location probe event. Similarly, a mobile device may provide an indication that the device is out of range of a previously connected wireless network (indicating that the device has moved) as a rough location probe event.

At 704, a precise location probing event may be scheduled. In certain embodiments, the precise location probing event may comprise a device location determination event performed by one or more one or more precise location sensors (e.g., a GPS sensor or the like) that, in some embodiments, may be less power-efficient but more accurate than a sensor associated with the rough location probing event.

In certain embodiments, the precise location probing event may be scheduled at a time Δt following receipt of the rough location probing event. The time at which precise location probing event is scheduled (e.g., Δt) may depend on a variety of factors and be determined using a variety of methods. For example, the time Δt may depend, without limitation, on information obtained through one more analytical, predictive, and/or learning methods utilizing historical information to predict future user and/or device behavior.

At 706, a determination may be made whether a second rough location probing event has been received prior to the precise location probing event scheduled at 704. If a second rough location probing event has not been received, the method may proceed to 708 and, after time Δt, the precise location probing event scheduled at 704 may be performed. If, however, a second rough location probing event has been received, the method 708 may proceed to 710, where the previously scheduled precise location probing event may be cancelled and a new precise location probing event may be scheduled at a time Δt following receipt of the subsequent rough location probing event. The method 700 may then proceed to 708, where after time Δt' following receipt of the subsequent rough location probing event, the new precise location probing event scheduled at 710 may be performed.

At 712, location information may be received from one or more sensors associated with the precise location probing event. Received location information may be utilized as state information consistent with the embodiments disclosed herein and/or in any other suitable context. It will be appreciated that although FIGS. 6 and 7 have been described, for the purposes of illustration, in the context of optimizing the use of location sensors with respect to power consumption, it will be appreciated that the systems and methods disclosed therein are readily applicable to optimizing the use of other types of sensors as well, in the context of power consumption or in the context of the use of any other suitable resource.

Figure 8:
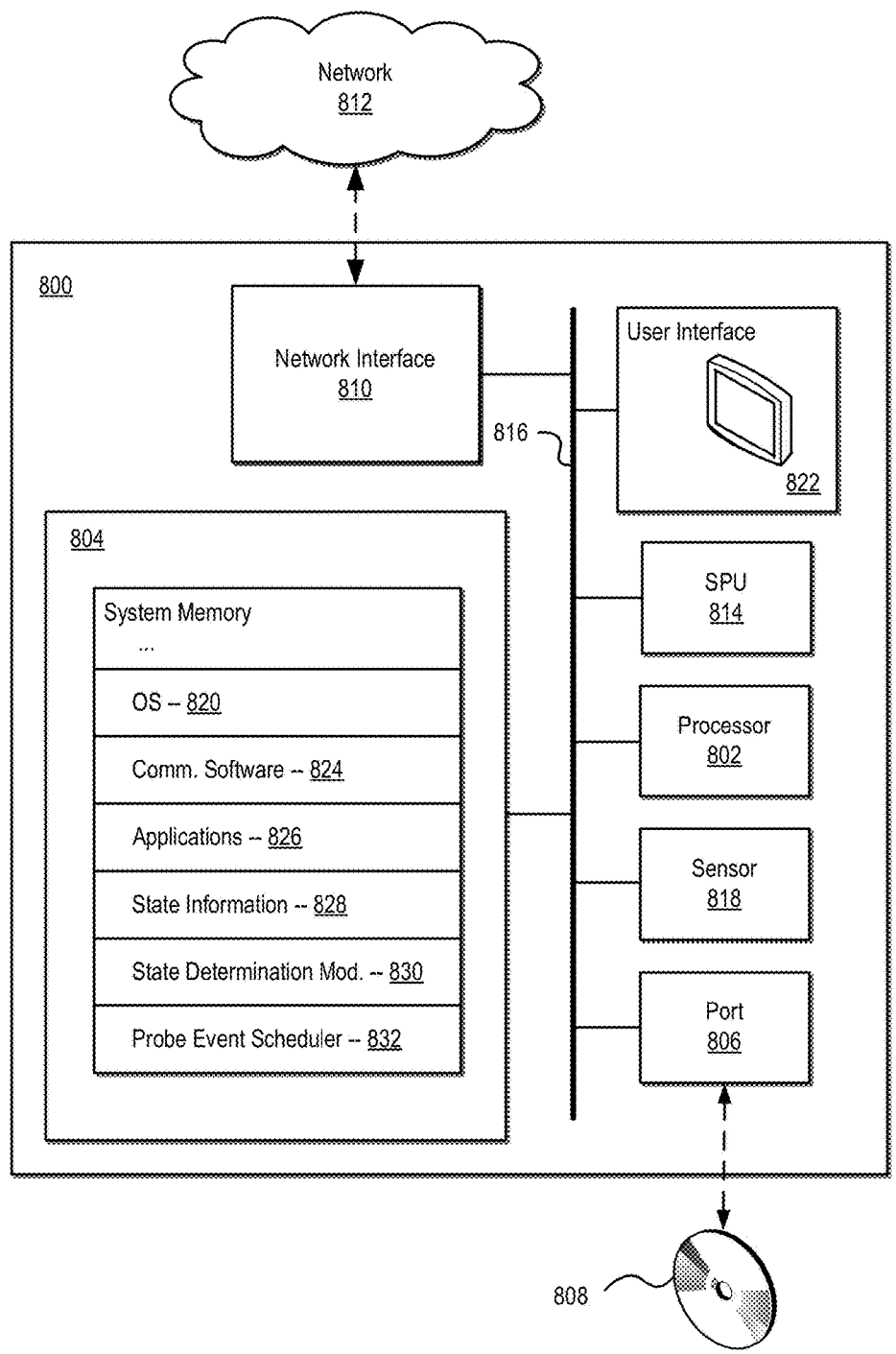
FIG. 8 illustrates an exemplary system that may be used to implement embodiments of the systems and methods of the present disclosure.

FIG. 8 illustrates an exemplary system 800 that may be used to implement embodiments of the systems and methods of the present disclosure. The exemplary system 800 may comprise a mobile device configured to perform the resource management operations disclosed herein. For example, the system 800 may comprise a cellular telephone, PDA, portable audio or video player, electronic book reader, tablet, laptop PC, gaming system, and/or any other system configured to implement the systems and methods described herein.

As illustrated in FIG. 8, system 800 may, for example, include: a processor 802; system memory 804, which may include some combination of high speed RAM, non-volatile memory, and/or one or more bulk non-volatile computer-readable storage mediums (e.g., a hard disk, flash memory, etc.) for storing programs and other data for use and execution by the processor 802; a user interface 822 that may include a display and/or one or more input devices such as, for example, a touchscreen, a keyboard, a mouse, a track pad, and/or the like; a port 806 for interfacing with removable memory 808 that may include one more diskettes, optical storage mediums (e.g., compact discs, DVDs, etc.), and/or other computer-readable storage mediums (e.g., flash memory, thumb drives, USB dongles, etc.); a network interface 810 for communicating with other systems via a network 812 using one or more communication technologies; one or more sensors 818 that may comprise one or more location sensors and/or any other sensor system including any of the sensor systems disclosed herein; and one or more buses 816 for communicatively coupling the aforementioned elements.

In certain embodiments, network 812 may comprise the Internet, a local area network, a virtual private network, cellular communications network, and/or any other communication network utilizing one or more electronic communication technologies and/or standards (e.g., Ethernet or the like). In some embodiments, the network interface 810 and/or network 812 may be part of a wireless carrier system, such as a personal communications system ("PCS"), and/or any other suitable communication system incorporating any suitable communication standards and/or protocols. In further embodiments, the network interface 810 and/or network 812 may be part of an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") technologies. In still further embodiments, the network interface 810 and/or network 812 may incorporate one or more satellite communication links and/or utilize IEEE's 802.11 standards, near-field communication, Bluetooth®, ultra-wide band ("UWB"), Zigbee®, and or any other suitable technology or technologies.

In some embodiments, the system 800 may, alternatively or in addition, include a secure processing unit ("SPU") 814 that is protected from tampering by a user of system 800 or other entities by utilizing secure physical and/or virtual security techniques. An SPU 814 can help enhance and/or facilitate the security of sensitive operations such as management of private personal and/or state information, and other aspects of the systems and methods disclosed herein. In certain embodiments, the SPU 814 may operate in a logically secure processing domain and be configured to protect and operate on secret information. In some embodiments, the SPU 814 may include internal memory storing executable instructions or programs configured to enable the SPU 814 to perform secure operations.

The operation of system 800 may be generally controlled by the processor 802 operating by executing software instructions and programs stored in the system memory 804 (and/or other computer-readable media, such as removable memory 808). The system memory 804 may store a variety of executable programs or modules for controlling the operation of the system 800. For example, the system memory 804 may include an OS 820 for managing and coordinating in part system hardware resources and providing for common services for execution of various applications. The system memory 804 may further include, without limitation: communication software 824 configured to enable in part communication within and by the system 800; applications 826 (e.g., media applications or other device applications), state information 828 utilized in performing certain resource management and/or sensor probe event scheduling operations such as those described herein; a state determination module 830 for determining a system state based on available state information 828 as described herein; and/or a probe event scheduler module 832 for performing certain sensor probe event scheduling operations described herein. The system memory 804 may further include any other functional module configured to implement the systems and methods disclosed herein when executed by the processor 802 and/or SPU 814.

One of ordinary skill in the art will appreciate that the systems and methods described herein can be practiced with computing devices similar or identical to that illustrated in FIG. 8, or with virtually any other suitable computing device, including computing devices that do not possess some of the components shown in FIG. 8 and/or computing devices that possess other components that are not shown. Thus it should be appreciated that FIG. 8 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable or interpretable code/instructions that, when executed by a processor, may cause a computer system to perform a method defined at least in part by the instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause a computer system to perform a method according to the instructions. In certain embodiments, the non-transitory storage medium may take any form capable of storing processor-readable instructions on a non-transitory storage medium. A non-transitory storage medium may, for example, be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a mobile device comprising a processor and a non-transitory computer-readable storage medium storing instructions that, when executed, cause the mobile device to perform the method, the method comprising:

receiving first device location information from a first sensor system of the mobile device;

determining, based on the first device location information, that the mobile device is in a transitory state;

scheduling a first location determination event by a second sensor system of the mobile device based on the determination that the mobile device is in the transitory state, the second sensor system differing from the first sensor system, the first location determination event being scheduled at an expiration of a first period of time initiated at a time of receipt of the first device location information, wherein the first period of time is based on a location indicated by the first device location information and a relative distance between the location indicated by the first device location information and one or more points of interest;

receiving second device location information from the first sensor system;

cancelling, in response to receiving the second device location information, the scheduled first location determination event;

scheduling a second location determination event by the second sensor system at an expiration of a second period of time, the second period of time initiated at a time of receipt of the second device location information; and performing the second location determination event by the second sensor system at the expiration of the second period of time.

2. The method of claim 1, wherein the first sensor system comprises a more power efficient sensor system than the second sensor system.

3. The method of claim 1, wherein the second sensor system comprises a more precise location sensor system than the first sensor system.

4. The method of claim 3, wherein the second sensor system comprises a Global Positioning System sensor system.

5. The method of claim 1, wherein the first device location information comprises device location coordinate information.

6. The method of claim 1, wherein the first device location information comprises information indicating that the mobile device has changed location.

7. The method of claim 6, wherein the mobile device comprises a cellular device and the first device location information comprises information indicating that the mobile device has transitioned between different cellular transmission systems.

8. The method of claim 1, wherein the first period of time is based on historical location-based usage information relating to the mobile device.

* * * * *